United States Patent
Cheatham et al.

(10) Patent No.: US 7,912,767 B1
(45) Date of Patent: Mar. 22, 2011

(54) TAX PREPARATION SYSTEM FACILITATING REMOTE ASSISTANCE

(75) Inventors: Alicia D. Cheatham, Allen, TX (US); Tanjanique M. Lutcher, Plano, TX (US); LaTasha Y. Sims, Plano, TX (US); Annette M. Williams, Plano, TX (US)

(73) Assignee: Intuit Inc., Mountain View, CA (US)

( * ) Notice: Subject to any disclaimer, the term of this patent is extended or adjusted under 35 U.S.C. 154(b) by 634 days.

(21) Appl. No.: 11/927,176

(22) Filed: Oct. 29, 2007

(51) Int. Cl.
*G06F 17/22* (2006.01)
*G07F 19/00* (2006.01)

(52) U.S. Cl. .................................. 705/31; 706/21

(58) Field of Classification Search .............. 705/31
See application file for complete search history.

(56) References Cited

U.S. PATENT DOCUMENTS

| | | | |
|---|---|---|---|
| 6,401,172 B1 * | 6/2002 | Prudvi et al. | 711/141 |
| 6,575,362 B1 | 6/2003 | Bator | |
| 6,615,240 B1 * | 9/2003 | Sullivan et al. | 709/205 |
| 6,646,863 B1 | 11/2003 | White | |
| 6,945,457 B1 | 9/2005 | Barcelou | |
| 7,100,195 B1 * | 8/2006 | Underwood | 726/2 |
| 7,565,312 B1 * | 7/2009 | Shaw et al. | 705/31 |
| 7,716,099 B1 * | 5/2010 | Welch et al. | 705/35 |
| 2002/0013747 A1 | 1/2002 | Valentine | |
| 2002/0133410 A1 | 9/2002 | Hermreck | |
| 2002/0138288 A1 * | 9/2002 | Kurpis | 705/1 |
| 2004/0010720 A1 * | 1/2004 | Singh et al. | 713/201 |
| 2004/0078307 A1 * | 4/2004 | Carver | 705/31 |
| 2004/0186792 A1 | 9/2004 | Sales | |
| 2004/0199828 A1 * | 10/2004 | Cabezas et al. | 714/39 |
| 2006/0010050 A1 | 1/2006 | Dowdell | |
| 2006/0041589 A1 | 2/2006 | Helfman | |
| 2006/0271451 A1 | 11/2006 | Varughese | |
| 2007/0005461 A1 | 1/2007 | Lenz | |
| 2007/0016475 A1 | 1/2007 | Calmenson | |
| 2008/0162310 A1 * | 7/2008 | Quinn et al. | 705/31 |
| 2008/0301074 A1 * | 12/2008 | Dozier | 706/21 |

* cited by examiner

*Primary Examiner* — F. Ryan Zeender
*Assistant Examiner* — Dana Amsdell
(74) *Attorney, Agent, or Firm* — Osha • Liang LLP

(57) ABSTRACT

A tax preparation application may initiate a tax preparation process for a user. The tax preparation process may detect that the user is having difficulty with the tax preparation process and present an option to the user to contact a tax preparation professional. If the user chooses to contact a tax preparation professional, the tax preparation application may present a list of tax preparation professionals to the user and request the user select one. Subsequent to the selection of a tax preparation professional, the tax preparation process may establish a communication channel between the tax preparation application and the tax preparation professional so that the tax preparation professional may assist the user. In some embodiments, the tax preparation process may be performed on a kiosk.

23 Claims, 8 Drawing Sheets

TAX PREPARATION SYSTEM FACILITATING REMOTE ASSISTANCE

BACKGROUND

Preparing a tax return can be a difficult and intimidating process. People prepare their tax returns in many different ways. Some people prepare their taxes manually, using pencil and paper. Others hire a tax preparation professional. Still others purchase specialized tax preparation software designed to lead the taxpayer through a series of steps that simplify the tax preparation process.

Technology advances have greatly impacted the way people prepare and file their tax returns. It is not uncommon for individuals to electronically file their tax returns to both federal and state tax authorities. Tax refunds can be wired directly into the taxpayer's bank account. Tax preparation software has become easier to use and is more accurate than ever before. Tax preparation professionals are more technically advanced with regard to communicating with customers, communicating with tax authorities and preparing tax documents.

Despite all of the advances in technology, many people are intimidated by the prospect of preparing and filing tax returns. Further, some people do not have access to computers or network connectivity. Many others are reluctant to meet with a tax professional. These people are intimidated by the notion of searching for a competent tax preparation professional that will charge a fair price.

Generally, most people view the tax preparation process as difficult, time consuming and intimidating.

SUMMARY

Various embodiments of a method and system for a tax preparation application are disclosed. According to one embodiment, a system comprises one or more processors and a memory coupled to the one or more processors, where the memory stores program instructions executable by the one or more processors to implement a tax preparation application. The tax preparation application may be configured to initiate a tax preparation process for a user.

In some embodiments, in addition to performing tax preparation functions, the tax preparation application may include additional functionality to detect a user having difficulty with the tax preparation process. For example, the tax preparation application may be configured to detect a user has pressed a back button multiple times or manipulated an input device indicating the need for help. In another embodiment, the tax preparation application may detect a user has worked on a particular screen within the tax preparation software application for a particularly long period of time.

In response to detecting the user is having difficulty with the tax preparation process, the system may present an option to the user (e.g., in the form of a pop-up window) to contact a tax preparation professional.

Subsequent to the user's selection of the option to contact a tax preparation professional, the tax preparation application may provide remote interaction with the tax professional selected by the user. In various embodiments, the remote interaction may include initiating a chat session, initiating a telephone call, sending an email or scheduling an appointment between the user and the tax professional.

In some embodiments, the tax preparation application may be located on a kiosk in a mall or another public place, dedicated to provide tax preparation application functions to one or more different users. In other embodiments the tax preparation application may be located on a user's home computer or on a computer in a business.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF EMBODIMENTS

A tax preparation application may be provided and configured to initiate a tax preparation process for a user. In some embodiments, the tax preparation application (hereafter referred to as "tax application") may be configured to detect a situation in which a user is having difficulty with the tax preparation process. In some embodiments, in response to detecting the user is having difficulty with the tax preparation process, the tax application may present an option to the user to contact a tax preparation professional, (hereafter referred to as a "tax professional"). If the user selects the option to contact the tax professional, the tax application may provide remote interaction with the tax professional over a communications channel.

Figure 1:
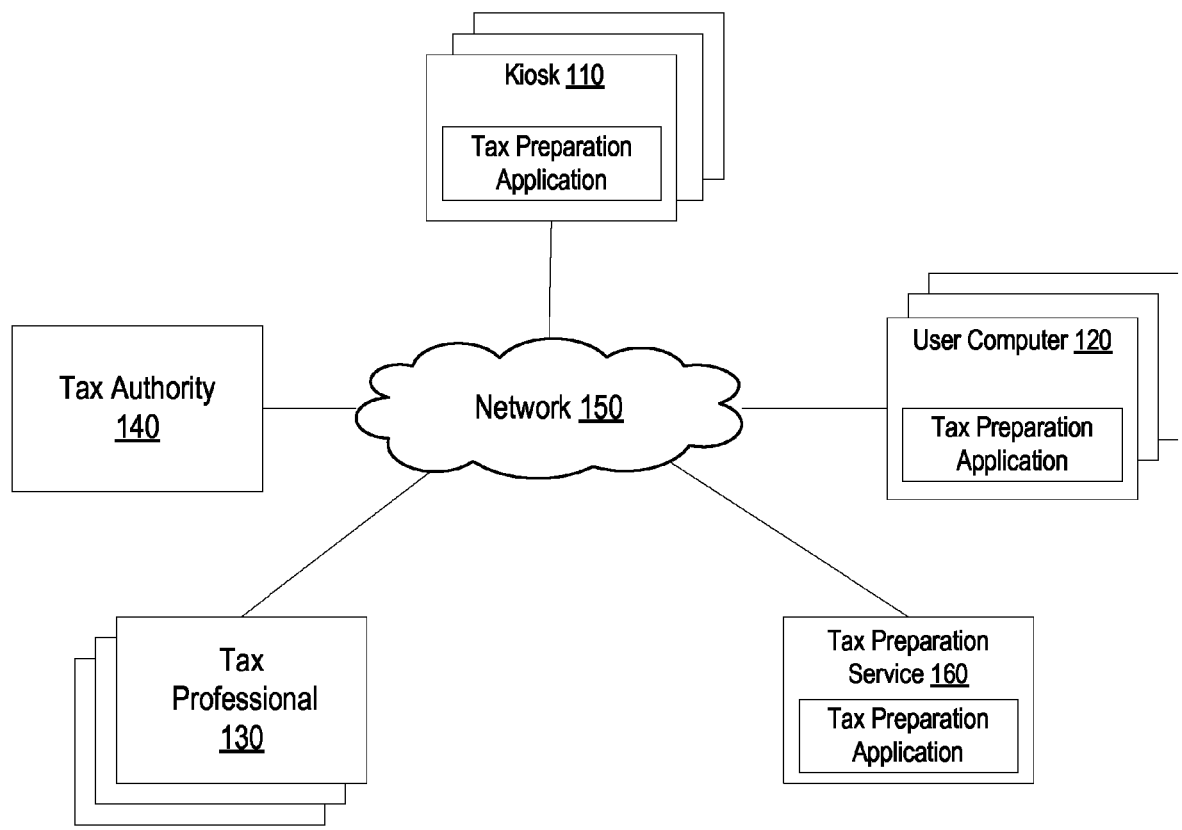
FIG. 1 is a block diagram illustrating a user computer, kiosk, tax professional, tax preparation service and tax authority all connected via network, according to an embodiment.

FIG. 1 is a block diagram illustrating a user computer, kiosk, tax professional, tax preparation service and tax authority, all connected via network, according to an embodiment.

Kiosk 110 may be any computing device configured to provide a tax application as a dedicated function to one or more users. In some embodiments, the kiosk may be implemented in a public place where one or more users may have access to the tax application. The kiosk may be dedicated to the tax application, meaning the user can only interact with the tax application and no other application. The kiosk may be connected to network 150. In some embodiments, kiosk 110 may run a stand-alone tax application, whereby the application is located on kiosk 110 computing device. In other embodiments, kiosk 110 may download the tax application from tax preparation service 160 and execute the tax application locally on the kiosk computing device, for example within a web browser. The tax application running on the kiosk 110 may be configured to interact and communicate with a tax professional 130. Kiosk 110 may be configured to scan financial documents and send the financial documents to tax professional 130 The act of remotely interacting with tax professional 130 may include sharing data, scheduling appointments, exchanging messages and/or establishing voice communications. Kiosk 110 may also be configured to complete a tax return and e-file the tax return to tax authority 140. There may be one or more kiosks at the same location or in various locations performing tax functions at any given time.

User computer 120 may represent any computing device capable of executing programming instructions implementing a tax application. User computer 120 may be configured to connect to network 150. The tax application may perform tax preparation functions and may be enabled to e-file a tax return with tax authority 140. User computer 120 may also be configured to interact remotely with tax professional 130. The act of interacting with tax professional 130 may include sharing data, scheduling appointments, exchanging messages and/or establishing voice communications. There may be multiple user computers 120 in multiple locations performing tax preparation functions at any given time. In various embodiments, user computer 120 may be implemented in a user's home, in a business, or anywhere else where network connectivity 150 is available. User computer 120 may be implemented as a personal computer, laptop computer, server, personal digital assistant or another computing device capable of executing program instructions implementing a tax application. User computer 120 may be configured to connect to network 150 and may be further configured to interact with tax professional 130 by means of Internet chat, instant messaging, email, voice over IP (VOIP), analog telephone, or some other means. User computer 120 may be configured to scan financial documents and send the financial documents to tax professional 130. In some embodiments, user computer 120 may be configured to complete a tax return and send the tax return to tax authority 140.

Tax authority 140 may be any tax authority configured to receive and process tax return information. Tax authority 140 is the system to which users file tax returns. Tax authority 140 may be connected to network 150. In some embodiments, tax authority 140 may be a federal tax authority, (i.e., Internal Revenue Service). In other embodiments, tax authority 140 may be a state tax authority, local tax authority or another tax authority.

In various embodiments, tax professional 130 may be any system configured to interact with customers for the purpose of preparing tax returns. Tax professional 130 may be configured to communicate with tax authority 140, kiosk 110 and user computer 120 via network 150. Tax professional 130 may interact with a customer associated with kiosk 110 or user computer 120 to help prepare and file tax returns. The human tax professional associated with tax professional 130 may interview the customer by asking questions related to the customer's finances and tax return. Tax professional 130 may be configured to receive financial documents from a customer utilizing user computer 120 or kiosk 110. In various embodiments, tax professional 130 may be configured to communicate with kiosk 110 or user computer 120 utilizing instant messaging, Internet chat, voice over IP (VOIP), email, analog telephone or some other means. Tax professional 130 may be configured to complete a customer's tax return based on the information obtained from the customer and file the tax return with tax authority 140.

Tax preparation service 160 may be any entity configured to provide tax preparation network services. Tax preparation service 160 may communicate with kiosk 110, user computer 120, tax authority 140 and tax professional 130 utilizing network 150. In some embodiments, a tax application may be located on tax preparation service 160 and may be downloaded to user computer 120 or kiosk 110 via network 150. Tax preparation service 160 may also store tax return information for users associated with kiosk 110 and user computer 120 in a database or another data store.

Network 150 may be configured to allow data to be exchanged between kiosk 110, user computer 120, tax preparation service 160, tax professional 130 and tax authority 140. Network 150 may correspond to various methods of communication between entities and may include, but is not limited to communication via telephone, fax, email, real-time messages (e.g., instant messaging), voice messages, voice over IP (VOIP), electronic documents (e.g., email or file transfers) and calendar functions. In general, network 150 may represent any method that one entity may utilize to communicate with another entity. While network 150 may be illustrated in a generalized manner, one of ordinary skill in the art will recognize that network 110 is meant to be representative of a complete communication path between entities with a specific type of communication channel. For example, network 150 may represent an email communication channel including various intermediate destinations and/or systems such as email clients, email servers, and/or communication networks (e.g., the Internet). In another example, a communications channel may include one or more telecommunications networks as well as various network devices including circuits, switches, routers, hubs and/or gateways. In other embodiments, network 150 may allow data to be exchanged between entities. In various embodiments, network 150 may support communication via wired or wireless general data networks, such as any suitable type of network including the Internet and/or Ethernet LAN; via telecommunications/telephony networks such as analog voice networks or digital fiber communications networks; via storage area networks such as Fiber Channel SANs, or via any other suitable type of network and/or protocol.

In one example of how the tax preparation process may work, a user associated with kiosk 110 (or user computer 120 or tax preparation service 160) may perform tax preparation functions using the tax preparation application. In this example, the user may encounter difficulties entering W2 information into the application. The tax preparation application may detect the user is having difficulties because the user has pressed a "back button" several times. The tax preparation application may display a dialog box asking the user associated with kiosk 110 if he or she would like to be assisted by tax professional 130. In this example, the user presses a "Yes" button within the tax application. The tax application may then present a list of tax professionals 130 to the user. The user may select one of the tax professionals 130 and the tax application (i.e., kiosk 110) may then contact the selected tax professional 130 and establish an online chat session between kiosk 110 and tax professional 130 so that the human tax professional associated with tax professional 130 may assist the user associated with kiosk 110 with his or her tax return. In this example, kiosk 110 may also scan the user's financial documents and send the user's financial information to tax professional 130. Tax professional 130 may then assist the user and subsequently, when the tax return is complete, kiosk 110 may submit the tax return to tax authority 140.

The example above is only meant to illustrate one possible scenario and many different embodiments and variations are possible.

Figure 2:
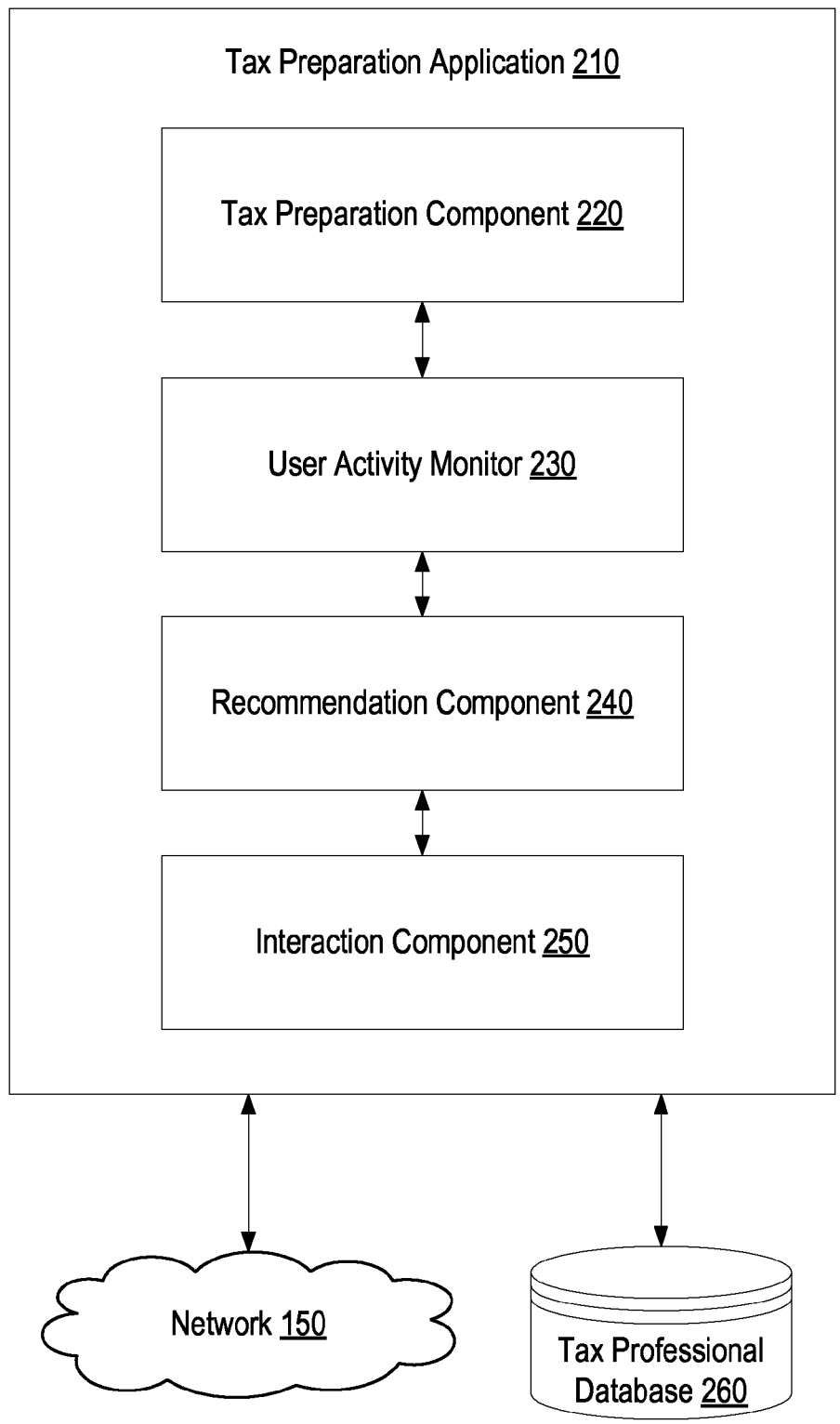
FIG. 2 is a block diagram illustrating a tax preparation application, according to an embodiment.

FIG. 2 is a block diagram illustrating a tax application, according to an embodiment. In some embodiments, tax application 210 may be implemented as a stand-alone application residing on kiosk 110 or user computer 120. In other embodiments, tax application 210 may be implemented as a web application, which can be downloaded from or run from tax preparation service 160 and run within a web browser. Tax application 210 may be implemented in a procedural programming language (e.g., C or C++) or an object oriented programming language (e.g., Java or C#) or another programming or scripting language executable on a computing device. In some embodiments, tax application 210 may be implemented as one or more components within a framework, such as .NET or J2EE or some other framework. Tax preparation application 210 may utilize HTML, JavaScript, AJAX, SOAP, COM, DCOM, CORBA or another suitable technology. Tax application 210 may be configured to interact with a web server, web service, application server and/or database located locally (i.e., on the same computer system) or remotely on another system accessed via network 150.

Tax preparation component 220 is configured to prepare a tax return. Tax preparation component 220 may be configured to scan a user's financial documents (e.g., utilizing an attached scanner) and lead the user through a series of steps and questions whereby the user's answers to the questions and the scanned documents or otherwise input information are used by the tax preparation component 220 to prepare the tax return.

User activity monitor 230 is configured to monitor a user's interaction with tax application 210 to determine if the user is having difficulty. In cases where tax application 210 determines a user is having difficulty, the user is offered the option to interact with tax professional 130.

In various embodiments, in order to determine a user is having difficulty, activity monitor 230 may utilize various counters, timers and thresholds. For example, in one embodiment, user activity monitor 230 may monitor the user's interaction with the keyboard to count the number of times the user has selected a "Back" button. User activity monitor 230 may monitor the length of time a user spends entering data into one or more fields. In various embodiments, a threshold may be related to the length of time (e.g., seconds) it takes a user to complete one or more activities. In another embodiment, the activity monitor may monitor the number of times a user has indicated a "Help" selection. Activity monitor 230 may monitor one or more activities simultaneously. In various embodiments, activity monitor 230 may be configured to compare one or more counters related to an activity, to an associated threshold. When a threshold is exceeded, the recommendation component 240 may offer the assistance of a tax professional 130. For example, activity monitor 230 may have a threshold associated with a "Help" menu selection. The threshold may be set at the number three. When a user selects the "Help" button three or more times, indicating the threshold is exceeded, the recommendation component 240 may display a dialog box asking the user if he or she would like to contact a tax professional 130. In some embodiments, thresholds associated with activities may be adjusted up or down. In other embodiments, the user activity monitor 230 may be turned off, such that the tax preparation application will not monitor a user's activity or offer the assistance of a tax professional 130.

Following are examples of activities that may be monitored by the activity monitor 230 and may cause the recommendation component to offer the assistance of a tax professional 130 to a user: (1) The user selects a help menu item or presses a help button, e.g., more than three time in the same screen. (2) The user has taken more than a threshold length of time to complete entry of a predefined subset of the information needed for the return. For example, if the user has been interacting with the same screen for more than five minutes. (3) The user attempts to access a previous screen. For example, the user has pressed the "Back Button" on a screen. (4) The user attempts to access a next screen without completing the input needed in the current screen. This situation may occur when two or more data entry screens are in a particular order. (5) The user attempts to print or electronically file a tax return that has critical errors. (6) The user selects to "Skip" a critical screen or input, such as "Skip W-2". (7) Tax due is more than average for a person with similar income. (8) The refund due is more than average for a person with similar income. (9) Inactivity is detected within the program for longer than a predefined threshold (e.g., five minutes). (10) The user selects the "Contact Us" menu. (11) Offer assistance on the summary page of each section of the return. Examples include the income summary, deduction summary or credit summary. (12) The user selects to edit, delete or revisit information that had been previously entered. For example, the user changes previously entered information more than a threshold number of times. (13) The user selects another section before completing the current section. For example, the user is entering income information and then selects the deduction section before the program has gone through all income categories. (14) The user attempts to exit an incomplete return. (15) The user does not make a selection on screens that ask, "Select all that apply?" (16) The user selects a version of a tax application 210 that does not cover their tax situation and the user does not want to upgrade. (17) The user selects to delete a form. (18) The user selects to clear the tax return. (19) If the complexity level of a tax return is greater than a predetermined threshold, the tax application 210 may present the user with the option to contact a tax professional 130.

Those skilled in the art will recognize that many other activities associated with a user interacting with tax application 210 may be monitored.

Recommendation component 240 presents the user of tax application 210 an option to contact a tax professional 130 in response to determining a user is having difficulty with tax application 210. In one embodiment, the recommendation component may display a dialog box asking the user if he or she would like to contact a tax professional 130. If the user answers "No" the tax application continues. If the user answers "Yes" the tax application may display a list of tax professionals and asks the user to select one.

In some embodiments, recommendation component 240 may display a list of tax professionals located in the same geographic area as the user. Tax application 210 may obtain the user's identification data in the form of an address, zip code, telephone number or other information, and compare the identification data to the location of available tax professionals 130 in tax professional database 250.

In some embodiments, recommendation component 240 may be configured to determine a cost of tax preparation services provided by tax preparation professional 130, dependent on the tax information submitted by the user. Some tax returns are more complex than others and therefore may require more time to prepare. Recommendation component 240 may display to the user a cost of tax preparation services provided by tax professional 130.

In various embodiments, if the user of tax application 210 chooses to contact a tax professional, tax application 210 may contact and interact with the tax professional 130 that the user selects. Interaction between tax application 210 and tax professional 130 may include securely sending the user's tax information from tax application 210 to tax professional 130. In addition, interaction may take the form of an online chat, telephone call, text messaging, email, fax, file transfer or calendar scheduling of a face-to-face appointment. In various embodiments, communication between user computer 120 and tax professional 130 be accomplished in a secure fashion, using various encryption technologies.

In various embodiments, tax professional database 260 may be configured to contain a list of available tax professionals 130. Database 260 may contain tax professional 130 location information, preferred methods of communication and tax preparation cost information. Tax professional database may be queried by tax application 210.

In one example, a user associated with user computer 120 may utilize tax preparation application 210 to prepare a tax return. User computer 120 may scan financial documents. User computer 120 may also display questions on a user computer 120 display device regarding finances and taxes, and the user associated with user computer 120 may enter answers using an input device. In this example, the user associated with user computer 120 may press the "Help" button several times while on a screen regarding W-2 information. User activity monitor 230 may detect that the user has pressed the "Help" button. Recommendation component 240 may then display a dialog box on user computer 120, displaying text stating that tax preparation application 210 has detected that the user may be having trouble with W-2 information. The dialog box may ask the user if he or she would like to speak with a tax professional. In this example, the user presses, "Yes". Interaction component 250 may then determine the location of the user, from the user's previously entered zip code. Interaction component 250 may select tax professionals 130 from tax professional database 260. Interaction component 250 may then display the list of tax professionals 130 on a display device connected to user computer 120. The user associated with user computer 120 may then select one of the professionals and interaction component 250 may establish an online chat session (or some other communications method) between user computer 120 and the selected tax professional 130 via network 150 so that the tax professional associated with tax professional 130 may assist the user associated with user computer 120.

Figure 3:
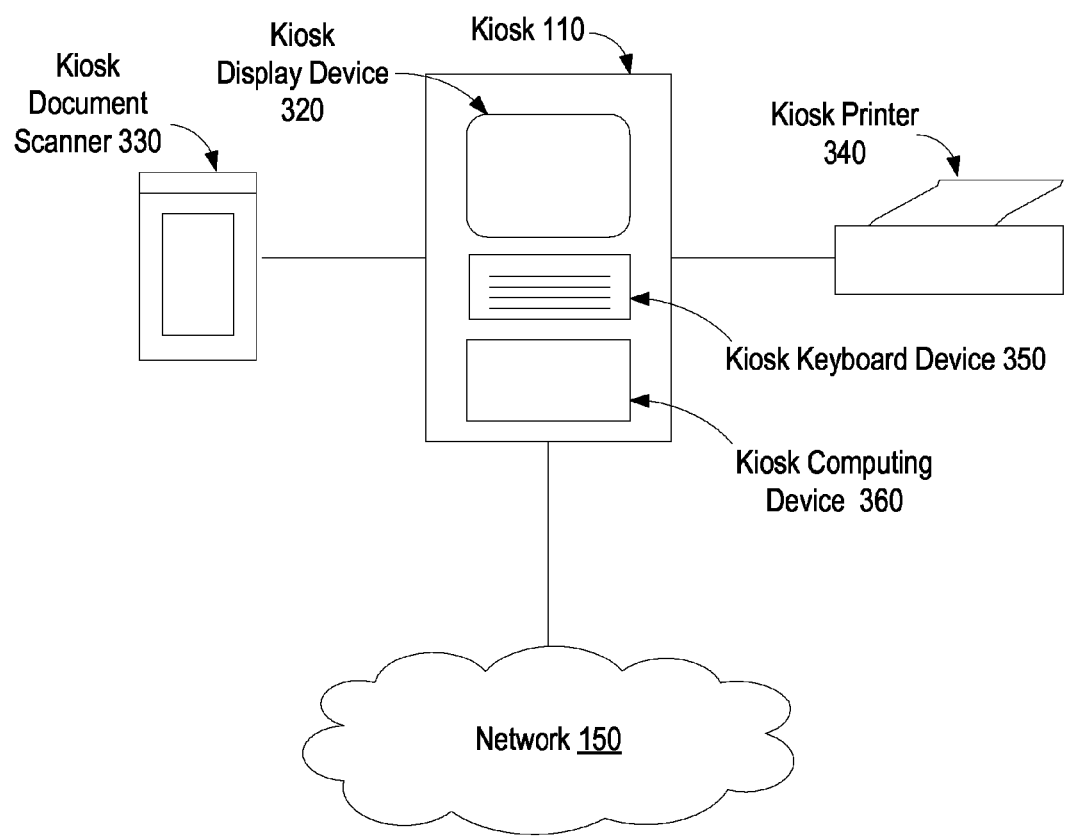
FIG. 3 is a block diagram illustrating a kiosk, according to an embodiment.

FIG. 3 is a block diagram illustrating a kiosk, according to an embodiment. A kiosk may be defined as a system that provides a tax preparation application as a dedicated function of the kiosk to a plurality of users. In some embodiments, a kiosk may be located in a public place and comprise a kiosk display device 320, kiosk keyboard device 350 and a kiosk computing device 360. Kiosk computing device 360 may be configured to host and execute tax application 210. Kiosk document scanner 330 may be configured to scan financial documents. Kiosk printer 340 may be configured to print tax return information. Kiosk 110 may be configured to connect to network 150 and interact with tax professional 130, tax authority 140 and tax preparation service 160.

In one example, a user may take his or her financial documents to a mall where kiosk 110 is located. The user may initiate tax preparation application 210 running on kiosk computing device 360 and scan his or her financial documents using scanner 330. Tax preparation application 210 may determine the user associated with kiosk 110 is having difficulty and offer the assistance of tax professional 130. In this example, the user selects a tax professional from a displayed list and tax application 210 connects the user associated with kiosk 110 to a tax professional 130 via network 150 utilizing Voice Over IP (VOIP). In this example, with the assistance of tax professional 130, the tax preparation process is completed and the tax return is e-filed (i.e., sent from kiosk 110 to tax authority 140). The tax return is then printed on printer 340 for the user to keep and store in his or her records.

Figure 4:
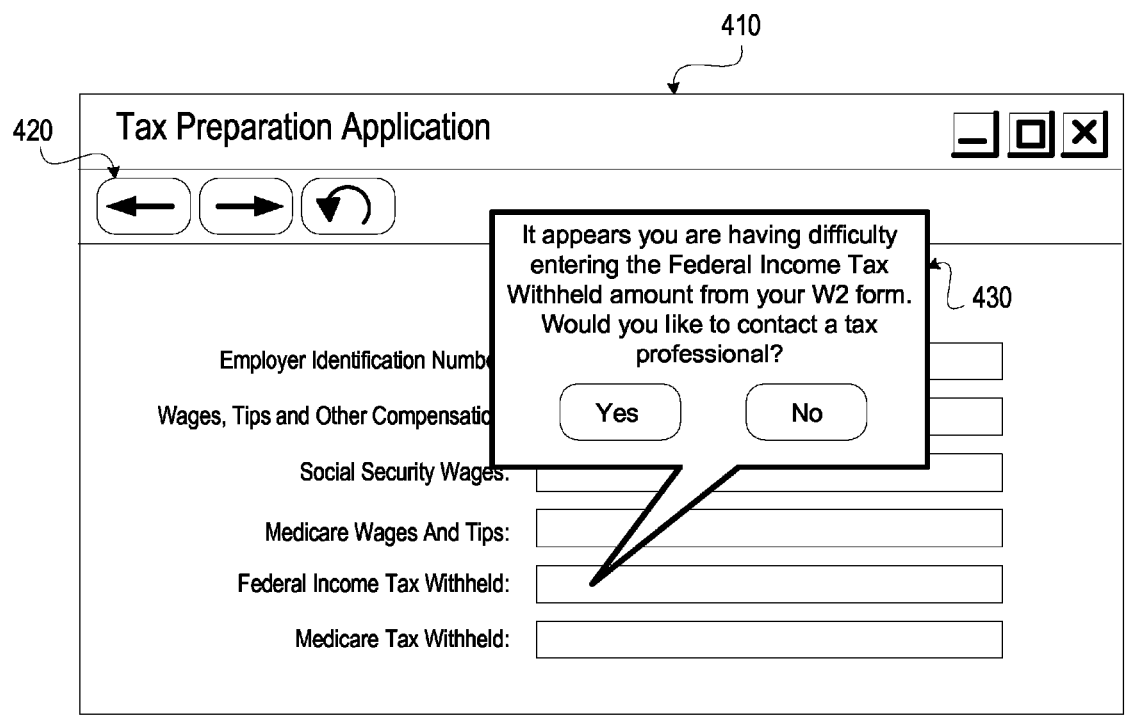
FIG. 4 is a user interface diagram illustrating a tax preparation application, according to an embodiment.

FIG. 4 is a user interface diagram illustrating a tax preparation application, according to an embodiment. FIG. 4 provides a visual example of a tax application 210 detecting a user is having difficulty. In the example illustrated in FIG. 4, a user is executing tax application 210 and has displayed screen 410. The screen contains fields requesting information from the user's W2 form. In this example, tax application 210 has determined the user is having difficulty entering an amount for Federal Income Tax Withheld. The tax application 210 may display a dialog box 430 asking the user if he or she would like to contact a tax professional. If the user presses, "No" the application will continue as normal. If the user presses "Yes" the application will display a list of tax professionals 130 and ask the user to select one. (FIG. 4 is meant as an example and the screen layout may be formatted differently in various embodiments.)

Figure 5:
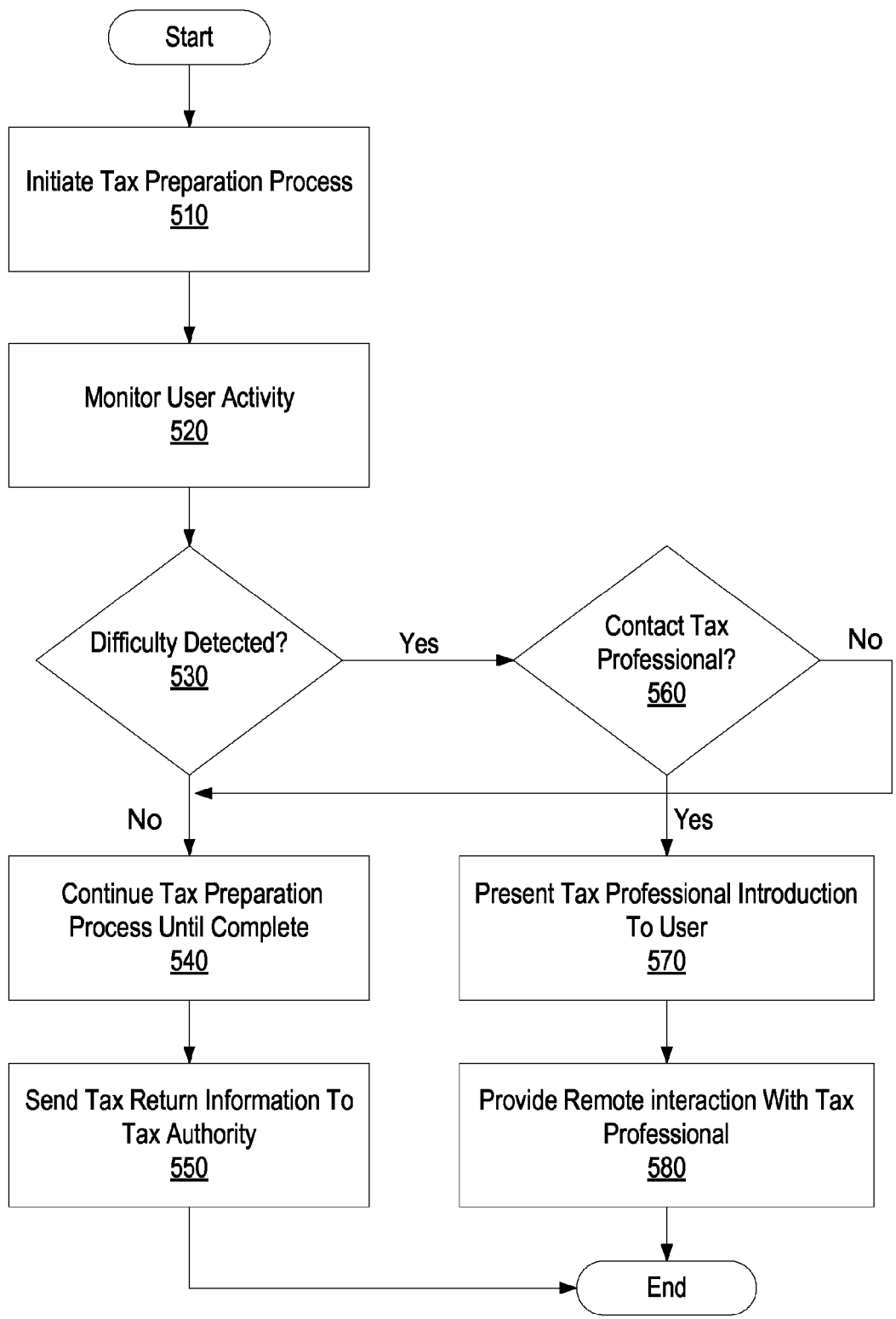
FIG. 5 is a flow diagram illustrating a method of detecting a user having difficulty with a tax preparation application and presenting the user with the option of interacting with a tax professional, according to an embodiment.

FIG. 5 is a flow diagram illustrating a method of detecting a user is having difficulty with a tax preparation application and presenting the user with the option of interacting with a tax professional, according to an embodiment. As depicted in block 510, a user may initiate the tax preparation process utilizing tax application 210. The tax application 210 may monitor user activity as shown in block 520. If the tax application 210 determines the user is having difficulty (block 530) the user is given the option of contacting and interacting with a tax professional 130, as shown in block 560. If the user decides not to contact a tax professional 130, tax application 210 continues until the tax preparation process is complete (block 540) and sends the tax return to the tax authority 140 as shown in block 550. If the user chooses to contact a tax professional 130, tax application 210 presents a list of tax professionals to the user as shown in block 570. In this case, the user may choose one of the professionals and tax application 210 provides remote interaction with the tax professional as shown in block 580.

In one example, a user associated with user computer 120 may utilize tax application 210 to initiate a tax preparation process as shown in block 510. In this example, a user may take longer than five minutes to enter information regarding the user's marital status and the number of dependents. As shown in block 520, tax application 210 may monitor the user's activity and determine the user is having difficulty as shown in block 530. Tax application 210 may display a dialog box similar to item 430 on FIG. 4 asking the user if he or she would like the assistance of a tax professional. (See block 560.) The user associated with user computer 120 chooses to contact a tax professional 130 and tax application 210 presents an introduction to the tax professional as shown in block 570. User computer 120 is then connected with tax professional 130 so that they may communicate as shown in block 580.

In a variation of the example above, in some cases a user associated with user computer 120 may choose not to speak with a tax professional 130 when given the option, as depicted in block 560. In this case, the user is allowed to continue with the tax preparation process as shown in block 540 and tax application 210 may complete and e-file the tax return with tax authority 140 as shown in block 550.

Figure 6:
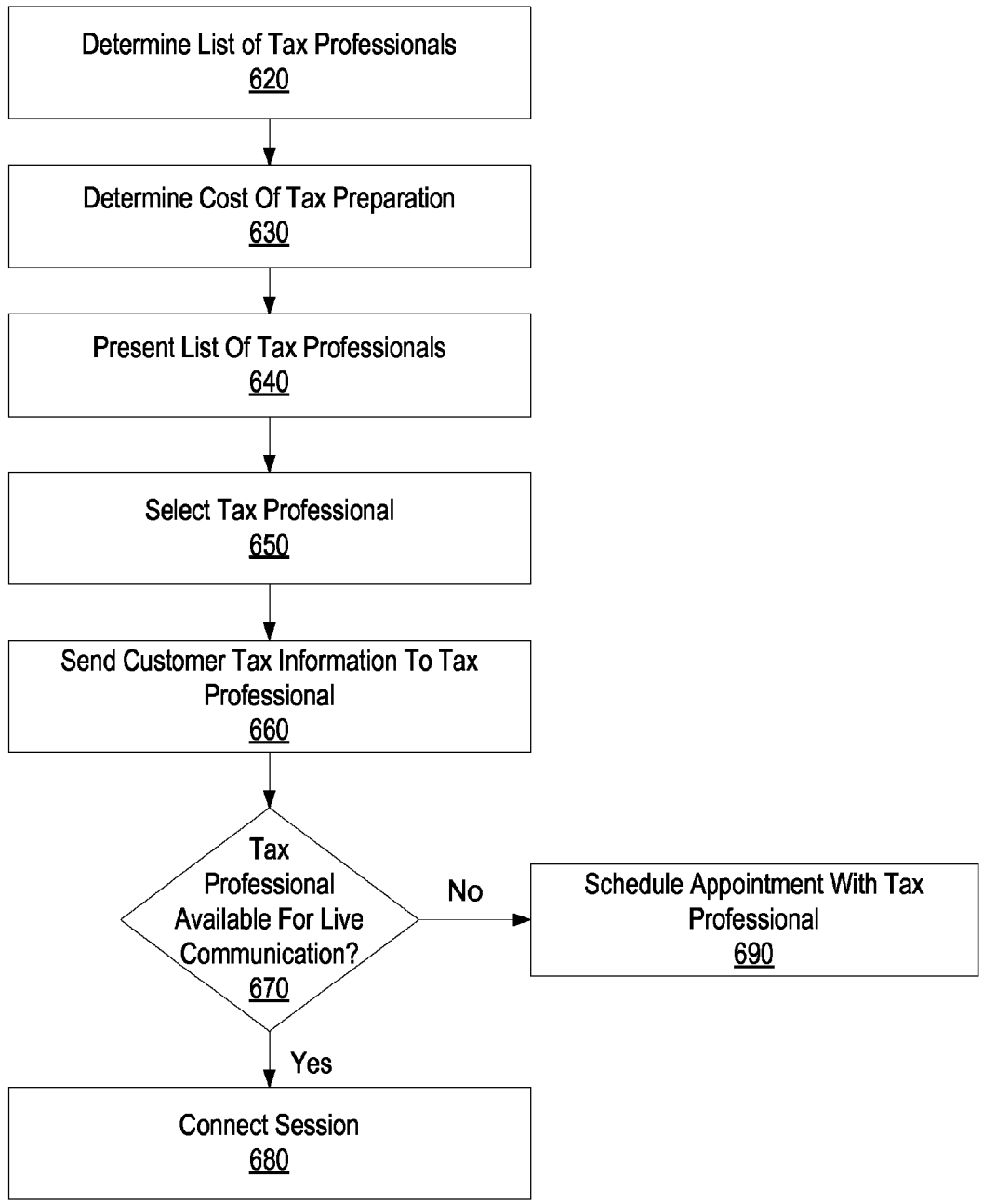
FIG. 6 is a flow diagram illustrating a method of presenting a list of tax professionals to a user, selecting a tax professional, and interacting with the tax professional, according to an embodiment.

FIG. 6 is a flow diagram illustrating a method of presenting a list of tax professionals to a user, selecting a tax professional, and interacting with the tax professional, according to an embodiment. Once the tax application 210 has determined a user is having difficulty, the tax application 210 may select a list of tax professionals 150 from tax professional database 250 as shown in block 620. The tax application 210 may determine the cost of tax preparation (block 630) depending on the complexity of the user's tax information. The level of complexity may be determined by scanning the user's financial documents and asking the user to enter financial data using a keyboard or other input device. Tax application 210 may then display a list of tax professionals 130 and the cost the tax professional may charge for assistance, depending on the complexity of the tax return. The user may then select a tax professional as shown in block 650. Tax application 210 may then send the tax information (entered by the user) to the tax professional (block 660). Tax application 210 may then attempt to establish a communication channel with tax professional 130, as shown in block 670. If tax professional 130 is available to interact with tax application 210, a communication channel will be established as shown in block 680. In various embodiments, tax professional 130 and tax application 210 may communicate by telephone, instant messaging, online chat, voice over IP (VOIP) or some other method. If tax professional 130 is not available for live communication, tax application 210 may schedule an appointment with tax professional 130 as shown in block 690. Scheduling an appointment may be accomplished by email or by accessing the tax professional's calendar via network 150.

Figure 7:
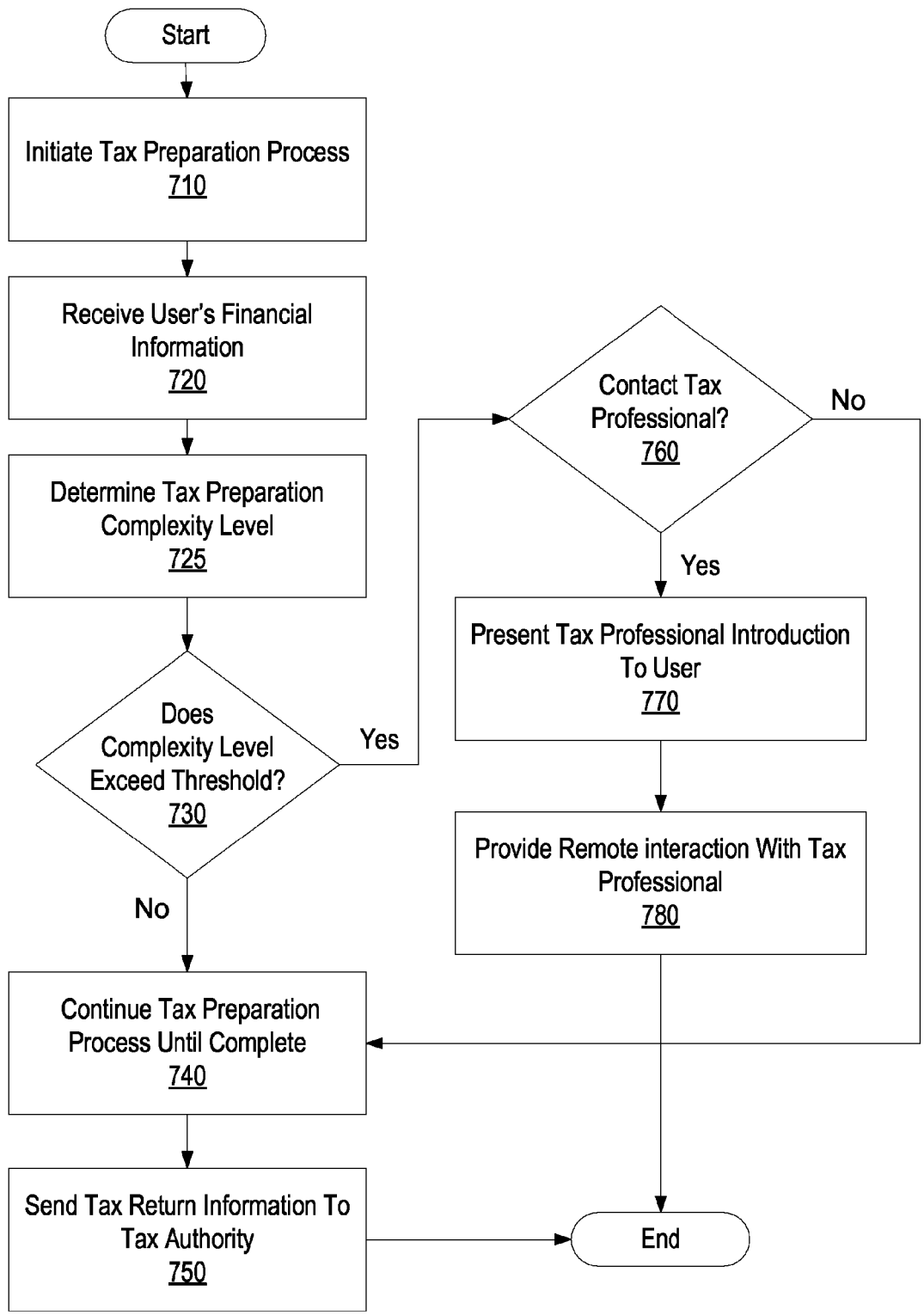
FIG. 7 is a flow diagram illustrating a method of determining the complexity level of a tax return and presenting the user with the option of interacting with a tax professional if the complexity level is beyond a threshold, according to an embodiment.

FIG. 7 is a flow diagram illustrating a method of determining the complexity level of a tax return and presenting the user with the option of interacting with a tax professional if the complexity level is beyond a threshold, according to an embodiment. As depicted in block 710, a user may initiate a tax preparation process utilizing tax application 210. The tax application 210 may receive the user's financial information as shown in block 720. In some embodiments, a device such as scanner 330 may scan financial information. In other embodiments, the user may enter financial information using an input device, such as keyboard 350, or some other input device. Tax application 210 may determine a complexity level for the tax return as shown in block 725, dependent on the financial information received from the user. The complexity level may be compared to a complexity threshold as shown in block 730. If the complexity level exceeds the threshold, the user may be given the option of contacting a tax professional, as shown in block 760. If the user chooses to contact a tax professional 130, a list of tax professionals 130 is presented to the user, as shown in block 770. When the user selects a tax professional 130, tax application 210 provides remote interaction with the tax professional 130.

In the case where the user chooses not to contact a tax professional, (block 760) the user may continue with the tax preparation process until complete, as shown in block 740. Tax application 210 may send the tax return information to the tax authority 140 as shown in block 750.

Tax preparation application 210 may determined a tax return is complex due to many different factors. In one example, tax application 210 may determine that financial information indicates a divorce occurred in the previous year and the couple's assets were divided. In another example, tax application 210 may determine that financial information indicates a high income individual. In other examples, tax application 210 may determine capital gains taxes must be paid or discover rental income from multiple states or income from off shore corporations. In various embodiments, many different tax situations may indicate a complex tax return.

Figure 8:
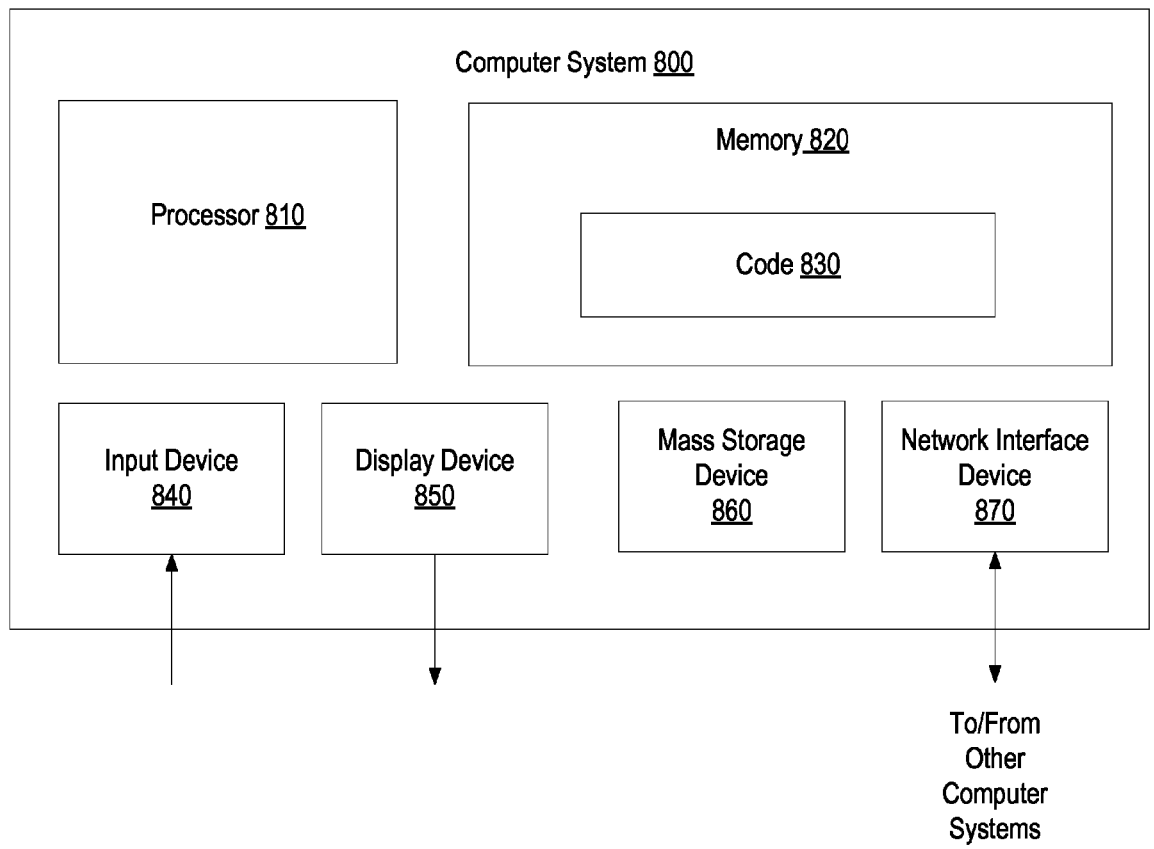
FIG. 8 is a block diagram illustrating a computing device, according to an embodiment.

FIG. 8 is a block diagram illustrating a computing device, according to an embodiment. Various components of embodiments of the tax preparation center as described herein, may be executed on one or more computer systems, which may interact with various other devices. One such computer system is illustrated in FIG. 8. In various embodiments, system 800 may be a computer system such as a desktop or laptop computer. In other embodiments system 800 may be a server such as a web server, application server, or database server, configured to service requests from clients. In general, system 800 may be any system capable of running an application. In some embodiments, it is contemplated that embodiments may be implemented using a single instance of computer system 800, while in other embodiments multiple such systems, or multiple nodes making up computer system 800, may be configured to host different portions or instances of embodiments. For example, in one embodiment some elements may be implemented via one or more nodes of computer system 800 that are distinct from those nodes implementing other elements. The layout of FIG. 8 is meant only as an example. Data and page design may be arranged differently in various embodiments.

In the illustrated embodiment, computer system 800 includes one or more processors 810. In various embodiments, computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments, processor 810 may be general-purpose or embedded processors implementing any of a variety of instruction set architectures (ISAs), such as the x86, PowerPC, Scalable Processor Architecture (SPARC), or Million Instructions per Second (MIPS) Instruction Set Architectures (ISAs), or any other suitable ISA. In multiprocessor systems, each of processors 810 may commonly, but not necessarily, implement the same ISA.

In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described for system for tax application 210, are shown stored within system memory 820 as program instructions (i.e., code 830). In other embodiments, tax application 210 data may be received, sent or stored upon different types of computer accessible media or on similar media separate from system memory 820 or computer system 800. Program instructions and/or data for tax application 210 may be stored on mass storage device 860 (e.g., a hard disk). Generally speaking, a computer accessible medium may include storage media or memory media such as magnetic, optical or solid-state media, e.g., hard disk, Digital Versatile Disk (DVD) Read Only Memory (ROM), Compact Disk—Read Only Memory (CD-ROM), tape volatile or nonvolatile media such as RAM (e.g. SDRAM, DDR SDRAM, RDRAM, SRAM, etc.), ROM, etc. for storing program instructions. Program instructions and data stored via a computer-accessible medium may be transmitted by transmission media or signals such as electrical, electromagnetic, or digital signals, which may be provided via a communication medium such as a network and/or a wireless link, such as may be implemented via network interface 870. Memory 820 and/or data storage 860 may be computer-accessible storage media that may include program instructions including tax application 210, configured to implement embodiments as described herein, and may also store various documents, tables, databases, etc. accessible by application 210.

In some embodiments, tax application 210 may be embedded or integrated within application programs or application program suites. In some embodiments, tax application 210 may be implemented as one or more standalone programs (e.g., an applet, module, plug-in, etc.) capable of executing within an operating system (such as Microsoft Windows™, Apple Macintosh™ OS, Linux/Unix, or other operating system environments) independent of or in conjunction with other applications. In other embodiments, tax application 210 may be implemented as part of an operating system.

In various embodiments, tax application 210 may be implemented in a programming language such as C or C++ and compiled into one or more executable code modules, or implemented in a scripting language. In other embodiments, tax application 210 may be written in a programming language compiled into bytecode and interrupted at runtime, such as Java™.

In various embodiments, the tax application 210 may be implemented as one or more web-based applications interacting with a network via network interface device 970. Tax application 210 may be implemented in or utilize the following technologies: Hypertext markup Language (HTML), Simple Object Access Protocol (SOAP), Java™, Javascript, Perl, Common Gateway Interface (CGI), .NET™, J2EE™, eXtensible Markup Language (XML), Asynchronous JavaScript and XML (AJAX), or other suitable technologies for providing application functionality to users.

Network interface 870 may be configured to allow data to be exchanged between computer system 800 and other devices attached to a network, such as other computer systems, or between nodes of computer system 800. In various embodiments, network interface 870 may support communication via wired or wireless general data networks, such as any suitable type of network, for example; via telecommunications/telephony networks such as analog voice networks or digital fiber communications networks including the Internet, LANs, WANs, wireless networks, or combinations of such networks; via storage area networks such as Fibre Channel Storage Area Networks (SANs), or via any other suitable type of network and/or protocol. Input/output devices 840 and 850 respectively, may in some embodiments include one or more display terminals, keyboards, keypads, touchpads, scanning devices, voice or optical recognition devices, or any other devices suitable for entering or retrieving data by one or more computer systems 800. Multiple input/output devices 840 and 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 870. Such input/output devices may provide for user interaction with tax application 210 within a user interface of a computing device (e.g., computer system 800).

Those skilled in the art will appreciate that computer system 800 is merely illustrative and is not intended to limit the scope of tax application 210 as described herein. In particular, the computer system and devices may include any combination of hardware or software that can perform the indicated functions, including computers, network devices, internet appliances, PDAs, mobile phones, pagers, etc. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, provided via a communication medium such as a network and/or a wireless link. Various embodiments may further include receiving, sending or storing instructions and/or data implemented in accordance with the foregoing description upon a computer accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM), etc., as well as transmission media or signals such as electrical, electromagnetic, or digital signals, provided via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

What is claimed is:

1. A system, comprising:
   one or more processors;
   a memory coupled to the one or more processors, wherein the memory stores program instructions executable by the one or more processors to implement a tax preparation application configured to:
   receive data from a user of the tax preparation application;
   populate a tax return for the user with the data identify, in the tax return, an income of the user;

identify, in the tax return, a value of a tax field for the user;

obtain an average value of the tax field for a plurality of users having a plurality of incomes within a predefined range of the income of the user;

calculate a difference between the average value of the tax field and the value of the tax field for the user;

present, in response to the difference exceeding a threshold difference, an option, identifying the tax field, to the user to contact a tax preparation professional;

receive, from the user, a selection of the option; and subsequent to the selection of the option, provide remote interaction with the tax preparation professional, wherein the user interactively completes the tax return with the tax preparation professional.

2. The system as recited in claim 1, wherein the remote interaction is one of an email, a chat session, an instant messaging session, a telephone call or scheduling an appointment between the user and the tax professional.

3. The system as recited in claim 1, wherein subsequent to the user's selection of the option, the system is further configured to:

display a list of tax professionals; and receive input from the user selecting one of the professionals, wherein the remote interaction is provided with the selected professional.

4. The system as recited in claim 1, wherein the tax preparation application is further configured to receive the data by scanning financial documents submitted by the user as part of the tax preparation process.

5. The system as recited in claim 1, wherein subsequent to receiving the data submitted by the user, the tax preparation application is further configured to:

determine a cost of tax preparation services provided by the tax preparation professional, dependent on the data submitted by the user; and display the cost of the tax preparation services to the user.

6. The system as recited in claim 1, wherein the tax preparation application is further configured to securely transmit the data of the user to the selected tax professional as a part of the remote interaction with the tax preparation professional.

7. The system as recited in claim 1, wherein the tax preparation application is further configured to:

determine a complexity level of the tax return for the user of the tax preparation application; and in response to the complexity level being greater than a threshold complexity level, present the option to the user to contact the tax preparation professional.

8. The system as recited in claim 1, wherein subsequent to the remote interaction with the tax professional, the tax preparation application is further configured to:

complete the tax return for the user; and securely transmit the tax return to tax authority.

9. A computer-implemented method, comprising:

receiving, by a tax preparation application executing on a computer processor, data from a user of the tax preparation application;

populating, by the tax preparation application executing on the computer processor, a tax return for the user with the data identifying, in the tax return, an income of the user;

identifying, in the tax return, a value of a tax field for the user;

obtaining, by the tax preparation application executing on the computer processor, an average value of the tax field for a plurality of users having a plurality of incomes within a predefined range of the income of the user;

calculating, by the tax preparation application executing on the computer processor, a difference between the average value of the tax field and the value of the tax field for the user;

presenting, by the tax preparation application executing on the computer processor and in response to the difference exceeding a threshold difference, an option, identifying the tax field, to the user to contact a tax preparation professional;

receiving, from the user, a selection of the option; and subsequent to the selection of the option, providing remote interaction with the tax preparation professional, wherein the user interactively completes the tax return with the tax preparation professional.

10. The method as recited in claim 8, wherein the remote interaction is one of sending an email, establishing a chat session, an instant messaging session, initiating a telephone call or scheduling an appointment between the user and the tax professional.

11. The method as recited in claim 9, further comprising:

displaying a list of tax professionals; and receiving input from the user selecting one of the professionals, wherein the remote interaction is provided with the selected professional.

12. The method as recited in claim 9, further comprising:

receiving the data by scanning financial documents submitted by the user as part of the tax preparation process.

13. The method as recited in claim 9, further comprising:

subsequent to receiving the data tax information submitted by the user:

determining a cost of tax preparation services provided by the tax preparation professional, dependent on the data submitted by the user; and displaying the cost of the tax preparation services to the user.

14. The method as recited in claim 9, further comprising:

securely transmitting the data of the user to the selected tax professional as part of the remote interaction with the tax preparation professional.

15. The method as recited in claim 9, further comprising:

determining a complexity level of the tax return for the user of the tax preparation application; and in response to the complexity level being greater than a threshold complexity level, presenting the option to the user to contact the tax preparation professional.

16. The method as recited in claim 8, further comprising:

subsequent to the remote interaction with the tax professional:

completing the tax return for the user; and securely transmitting the tax return to a tax authority.

17. A tangible, non-transitory computer-accessible storage medium comprising program instructions which, when executed by a computer, cause the computer to perform a method, the method comprising:

receiving data from a user of the tax preparation application;

populating a tax return for the user with the data;

identifying, in the tax return, an income of the user;

identifying, in the tax return, a value of a tax field for the user;

obtaining an average value of the tax field for a plurality of users having a plurality of incomes within a predefined range of the income of the user;

calculating a difference between the average value of the tax field and the value of the tax field for the user;

presenting, in response to the difference exceeding a threshold difference, an option identifying the tax field, to the user to contact a tax preparation professional;

receiving, from the user, a selection of the option; and subsequent to the selection of the option, providing remote interaction with the tax preparation professional, wherein the user interactively completes the tax return with the tax preparation professional.

18. The computer-accessible storage medium as recited in claim 17, wherein the remote interaction is one of an email, a chat session, an instant messaging session, a telephone call or scheduling an appointment between the user and the tax professional.

19. The computer-accessible storage medium as recited in claim 17, wherein the method further comprises:

displaying a list of tax professionals; and receiving input from the user selecting one of the professionals, wherein the remote interaction is provided with the selected professional.

20. The computer-accessible storage medium as recited in claim 17, wherein the method further comprises:

subsequent to receiving the data submitted by the user:

determining a cost of tax preparation services provided by the tax preparation professional, dependent on the data submitted by the user; and displaying the cost of the tax preparation services to the user.

21. The computer-accessible storage medium as recited in claim 17, wherein the method further comprises:

securely transmitting the data of the user to the selected tax professional as part of the remote interaction with the tax preparation professional.

22. The computer-accessible storage medium as recited in claim 17, wherein the method further comprises:

determining a complexity level of a tax return for the user of the tax preparation application; and in response to the complexity level being greater than a threshold, presenting the option to the user to contact the tax preparation professional.

23. The computer-accessible storage medium as recited in claim 17, wherein the method further comprises:

subsequent to the remote interaction with the tax professional:

completing a tax return for the user; and securely transmitting the tax return to a tax authority.

* * * * *

UNITED STATES PATENT AND TRADEMARK OFFICE
CERTIFICATE OF CORRECTION

PATENT NO.        : 7,912,767 B1
APPLICATION NO.   : 11/927176
DATED             : March 22, 2011
INVENTOR(S)       : Alicia D. Cheatham et al.

Page 1 of 1

It is certified that error appears in the above-identified patent and that said Letters Patent is hereby corrected as shown below:

In Claim 1, Column 12 (line 67), a ";" should be added after "data";

In Claim 3, Column 13 (line 23), "user's" should be deleted;

In Claim 9, Column 13 (line 62), a ";" should be added after "data";

In Claim 13, Column 14 (line 31), "tax information" should be deleted;

In Claim 17, Column 15 (line 2), a "," should be added after "option".

Signed and Sealed this
Seventeenth Day of May, 2011

David J. Kappos
*Director of the United States Patent and Trademark Office*